United States Patent [19]

Weaver

[11] Patent Number: 4,641,422

[45] Date of Patent: Feb. 10, 1987

[54] METHOD OF MAKING A PERMANENT MAGNET ROTOR FOR A SYNCHRONOUS MOTOR

[75] Inventor: Robert F. Weaver, Jamestown, Ind.

[73] Assignee: Emhart Industries, Inc., Indianapolis, Ind.

[21] Appl. No.: 660,601

[22] Filed: Mar. 16, 1984

Related U.S. Application Data

[60] Division of Ser. No. 894,517, Apr. 7, 1978, abandoned, which is a continuation of Ser. No. 668,314, Mar. 18, 1976, abandoned.

[51] Int. Cl.$^4$ ............................................ H02K 15/02
[52] U.S. Cl. ........................................ 29/598; 310/43; 310/156
[58] Field of Search .................... 29/598; 156/73.1; 310/42, 43, 156, 261

[56] References Cited

U.S. PATENT DOCUMENTS 3,881,243  5/1975  Bannon ................................ 29/598

Primary Examiner—Carl E. Hall
Attorney, Agent, or Firm—Robert F. Meyer

[57] ABSTRACT

A hub of a permanent magnet rotor includes an elongated one-piece body portion with a bore running therethrough, a circular disc carried by the body portion between ends thereof, and a ring surrounding the body portion and bonded to the circular disc.

2 Claims, 3 Drawing Figures

METHOD OF MAKING A PERMANENT MAGNET ROTOR FOR A SYNCHRONOUS MOTOR

The present application is a division of application Ser. No. 894,517 filed Apr. 7, 1978, now abandoned, which was a continuation of application Ser. No. 668,314 filed Mar. 18, 1976, now abandoned.

Generally speaking, the present invention relates to a rotor comprising a hub including an elongated one-piece body portion, a circular disc carried by and surrounding the elongated body portion between ends thereof and having an outer periphery, a plurality of ribs carried by the circular disc and extending between the elongated body portion and the outer periphery, a ring surrounding the elongated body portion and having an outer periphery, the ring being bonded to the disc near its outer periphery; and a permanent magnet carried about the outer ring and circular disc.

In accordance with the method of making the rotor, the ring is bonded to the disc at its outer periphery.

The rotor of the present invention has particular utility in small synchronous motors.

There are a multitude of applications for small synchronous motors of the type having a small permanent magnet rotor. Many of these applications are in timing devices such as in clocks or in appliances such as washers and dryers which utilize time sequence switches. In such applications, it is of prime importance that various elements of the synchronous motor be fabricated and assembled together at very close tolerances. And, even though very close tolerances are required, the cost of fabrication of the various elements as well as the cost of their assembly should be kept at a minimum. Typical of such elements is that of the rotor.

At one time the rotors were fabricated of a permanent magnet material in the form of a disc, the disc being magnetized so that one face was polarized north and the other south. The disc was then sandwiched between two metal spiders, the legs of which would then serve as pole pieces of opposite polarity. This type of rotor was somewhat difficult to fabricate to close tolerances and therefore somewhat costly. Of recent years permanent magnet materials have been developed that permit poles of opposite polarity to be impressed in their periphery. The polarized permanent magnet is then secured to a support or hub. Various means have been employed to secure the magnet to the hub including the use of adhesives and insert molding. While this technique has been for the most part satisfactory, the rotors still are somewhat costly due to the cost of manufacturing to close tolerances.

In U.S. Pat. No. 3,881,243 "Method of Making Permanent Magnet Rotor For Synchronous Motor" issued May 6, 1975 and in application Ser. No. 342,072, filed Mar. 16, 1973, now U.S. Pat. No. 3,953,752, which is the parent case of the referenced patent, there is described a rotor fabricated by ultrasonically welding two hub sections together, the sections carrying a permanent magnet. Both the patent and the application are incorporated herein by reference. While the rotor and the method of making the same are, for the most part satisfactory, there are a few problems. More particularly, it has been found to be difficult to control the height of the motor primarily because of the elongated central portion of the hub being in two sections. Such control of the motor height is necessary to insure that when the elements of the motor are "stacked" during assembly the tolerances will be well within limits such that there will be no "binding" of the elements. In addition, although the sections are bonded together near their outer peripheries only, there is still some tendency for the sections to warp and crack.

Accordingly, the present invention represents an improvement over the aforementioned patent and application and has as a feature the provision of a method of making a rotor by bonding at least two hub sections together. Another feature of the invention is the provision of such a method of making a rotor wherein the overall height is readily controlled and the tendency for the rotor to warp and crack is reduced. A further feature of the invention is the provision of such a method wherein an elongated one-piece body portion having a circular disc extending therefrom between the ends thereof is bonded to a ring. Still another feature of the invention is to provide such a method wherein the ring is ultrasonically welded to the circular disc near the disc's outer periphery. Yet another feature of the invention is to provide a rotor having a hub portion which includes an elongated one-piece body portion, a circular disc carried by and surrounding the body portion, a plurality of ribs carried by the circular disc, and a ring surrounding the body portion and bonded to the circular disc.

These and other features of the invention will become apparent from the following description taken in conjunction with the accompanying drawings wherein.

Figure 1:
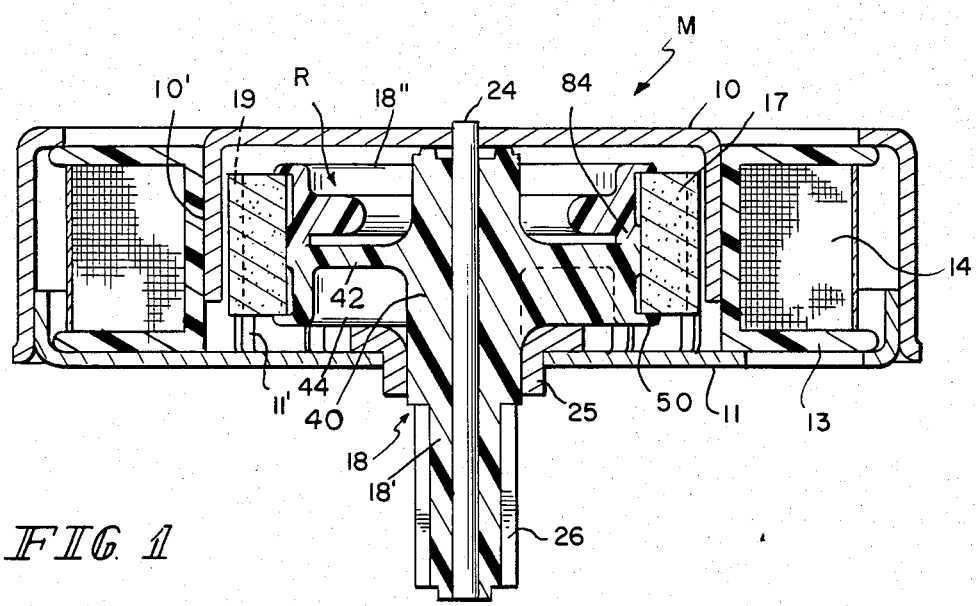
FIG. 1 is a section of a synchronous motor showing the rotor of the present invention.
Figure 2:
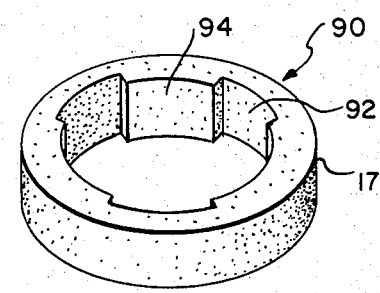
FIG. 2 is a perspective view of a permanent magnet.

Referring now to the drawings, the component part of the present invention can be visualized. A synchronous motor M includes a top shell 10 and a bottom shell 11 which are held together to form a housing. The material for the shells 10 and 11 may be ordinarily cold-rolled steel, preferably annealed. Integral poles 10' and 11' are formed by lancing radial strips out of the flat portions of the respective shells and forming them parallel to the center axis to form a circle of pole tips. The poles that are formed in the shells constitute stator field poles and when intermeshed provide a stator assembly for the motor of the present invention.

An energizing winding or coil 14, which includes an insulated spool wound with a predetermined number of turns of wire, is annularly disposed in the space between the ID of the shells 10 and 11 and the intermeshed stator poles 10' and 11' defining a circle. The wire is wound on a bobbin 13. Electrical leads (not shown) enables the coil to be connected to an AC power source.

The rotor R of the synchronous motor includes a permanent magnet in the shape of a ring 17 carried by a hub 18. The permanent magnet includes a material of a relatively high energy product partially oriented ceramic such as a barium ferrite ceramic magnet with its outer periphery being impressed or magnetized into separate pole segments 19 of alternate north and south polarity. The permanent magnet material preferably has an energy product of at least $1.4 \times 10^6$ gauss oersteds, and has a relatively large diameter to thickness ratio (about 4 to 1) to provide a high torque in a thin package. A suitable material for the magnet could be a material manufactured by Stackpole Carbon Co. and designated Stackpole A-20, for example. As shown, the hub 18 is carried by an axle 24 which is rigidly held to the top shell 10. Hub 18 is free to rotate about the axle with end play controlled by a gearbox cover (not shown). An output pinion 26 is formed as part of the hub 18.

In operation, when an AC current is applied to the coil 14, the rotor of the motor will begin to rotate due to the magnetic flux paths generated between the rotor poles and the stator poles, the starting of the rotor being initiated by an asymmetrical arrangement of the stator poles. Once the rotor is turning, a high running torque will be achieved through the combination of the rotor structure with its magnet of a material of relatively high energy product partial oriented ceramic and strong distinct poles, and the stator arrangement which provides alternating flux characteristics at individual poles. Should the rotor start its rotation in the wrong direction, a directional system (not shown) will stop the rotor and cause it to rotate in an opposite direction.

The construction of rotor R represents an improvement of the rotor described in the aforementioned U.S. Pat. No. 3,881,243 and application Ser. No. 340,072, now U.S. Pat. No. 3,953,752. More specifically, as will be hereinafter described, close tolerance between the rotor elements as well as a more rigid structure are achieved. In addition, the method of fabricating the rotor is more efficient and thus lower in cost.

As shown, rotor R includes a hub 18, comprises of two sections 18' and 18", carrying a permanent magnet 17. Section 18' includes an elongated one-piece body portion 40, a circular disc 42 carried by and surrounding the body portion between ends thereof, and a plurality of ribs 44 carried by the disc and extending between its outer periphery and body portion 40. The outer periphery of disc 42 includes a chamfered rim 46 and there is an L-shaped flange 50 extending therefrom. Elongated body portion 40 has a bore 51 running therethrough for receiving axle 24. Ribs 44 add stiffness to the circular disc. This is especially important during fabrication in that it reduces the tendency for the disc to warp during the bonding process. The use of the elongated, one-piece body portion as opposed to forming the elongated body portion from two sections as is taught in the aforementioned patent and application materially aids in maintaining close tolerances of the rotor elements during the bonding operation.

Section 18" includes a ring 60 having at its outer periphery a skirt 62 extending from one face thereof and an L-shaped flange 64 extending from an opposite face. Skirt 62 is more or less adapted to mate chambered rim 46 to enable a better bond between the ring and circular disc 42 to be produced. The use of the ring as opposed to a second circular disc as described in the aforementioned patent and application eliminates the problem of distortion between the two separate mating discs.

Both sections may be fabricated from a suitable thermoplastic material such as polypropylene, polyamide, polystyrene, polycarbonate, and acetal resins.

Figure 3:
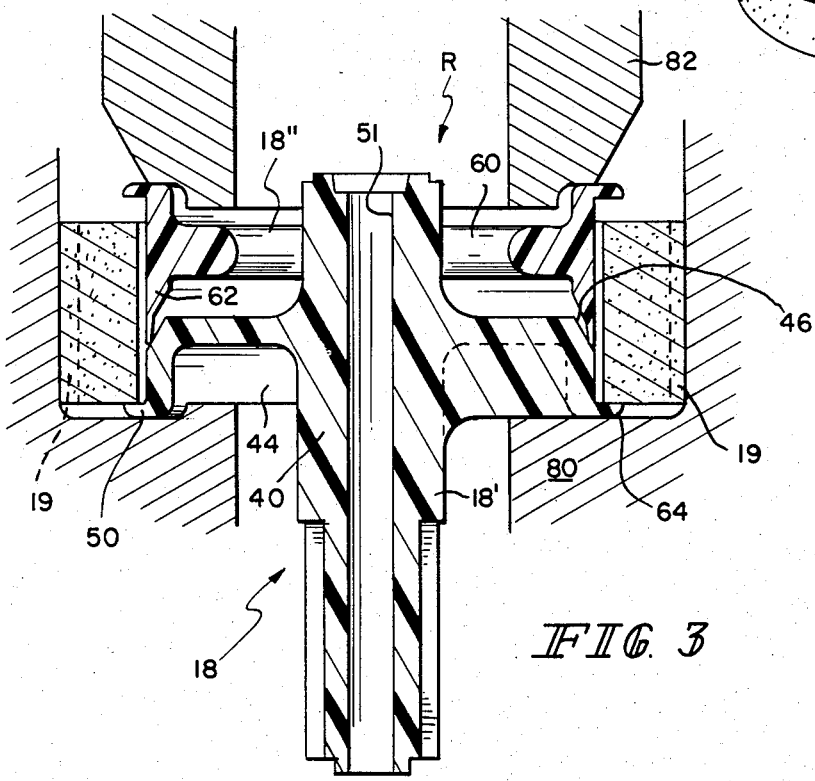
FIG. 3 is a view showing a permanent magnet rotor prior to assembly.

As further shown in FIG. 3, the two sections are positioned in spaced relationship prior to being bonded together. Section 18' is carried by a lower support number 80; permanent magnet ring 17 is carried by L-shaped flange 64; and section 18" is brought into contact with section 18" through peripheral skirt 62 by some suitable means (not shown). Heat and pressure is then applied to section 18" such that it can be welded or otherwise bonded to section 18', principally near the outer peripheries of the circular disc 42 and ring 60. In accordance with the present invention, the sections are bonded together through the application of ultrasonic vibrations. To this end, a means to transmit the vibrations such as horn 82 is brought into working relationsip with one of the sections (as illustrated in FIG. 3, section 18") such that a weld or bond may be effectuated between the two sections, principally at the outer peripheries. Horn 82 is, in practice, attached to an ultrasonic welding head (not shown) in a manner well known in the art. The horn is suitably shaped to mate section 18" to readily transmit vibrations to the section.

The welding head is, in practice, a sonic converter for converting alternating current into mechanical vibration at the same frequency. Such frequencies are usually in the ultrasonic range of 20,000 vibrations per second. Horn 82 maintains pressure against the section and sets up an ultrasonic wave path therethrough. The vibrations set up at the contact joint between skirt 62 and chambered rim 46 generate heat at or near the joint, causing skirt 62 to melt thus allowing the two sections to join together. The vibrations are continued until the sections are welded together, at least at the outer periphery, to form an integral bond 84 (FIG. 1).

Permanent magnet 17 includes a means 90 preventing angular displacement of the magnet with respect to the hub during and after bonding of the two sections together. Means 90 includes at least one recess 92 provided in the inner wall 94 of the magnet. During the bonding process, material from at least skirt 62 flows or is displaced into recesses 92 such that the magnet may not be angularly displaced.

What is claimed is:

1. A method of forming a permanent magnet rotor comprising:
    providing as one piece, an elongated body portion and a circular disc extending from said elongated body portion between opposed ends thereof and having an outer periphery;
    positioning a ring about said elongated body portion between said opposed ends such that said ring is substantially in line with said disc near said outer periphery only;
    positioning a permanent magnet having at least one recess therein about said ring and said circular disc; and
    applying an ultrasonic vibration to at least one of said ring and said circular disc to bond same together near said outer periphery, at least a portion of said ring and said circular disc being melted and flowing into at least said recess whereby said permanent magnet is secured in place.

2. A method according to claim 1 wherein hub portion, said circular disc, and said ring are fabricated from plastic.

* * * * *